United States Patent [19]

Sukhman

[11] Patent Number: 5,051,558
[45] Date of Patent: Sep. 24, 1991

[54] LASER MATERIAL PROCESSING APPARATUS AND METHOD THEREFORE

[76] Inventor: Yefim P. Sukhman, 4558 E. Evans Rd., Phoenix, Ariz. 85032

[21] Appl. No.: 326,013

[22] Filed: Mar. 20, 1989

[51] Int. Cl.$^5$ .............................................. B23K 26/16
[52] U.S. Cl. ........................... 219/121.68; 219/121.75; 219/121.78; 219/121.81; 219/121.82; 219/121.84; 219/121.63
[58] Field of Search ....................... 219/121.63, 121.68, 219/121.69, 121.74, 121.75, 121.78, 121.82, 121.84, 121.6, 121.85, 121.64

[56] References Cited

U.S. PATENT DOCUMENTS 4,319,120  3/1982  La Rocca .................... 219/121.8 X
4,839,493  6/1989  Herziger et al. ........... 219/121.62 X Primary Examiner—C. L. Albritton
Attorney, Agent, or Firm—Harry M. Weiss

[57] ABSTRACT

A laser provides pulses of coherent light to a workpiece via an optical path within substantially enclosed passageway. A flow of compressed gas through the passageways maintains optical elements therein free of contaminants. A uniform number of light pulses per inch of engraving are provided in accordance with a program. Additionally, the duration of each pulse is in accordance with the program.

21 Claims, 4 Drawing Sheets

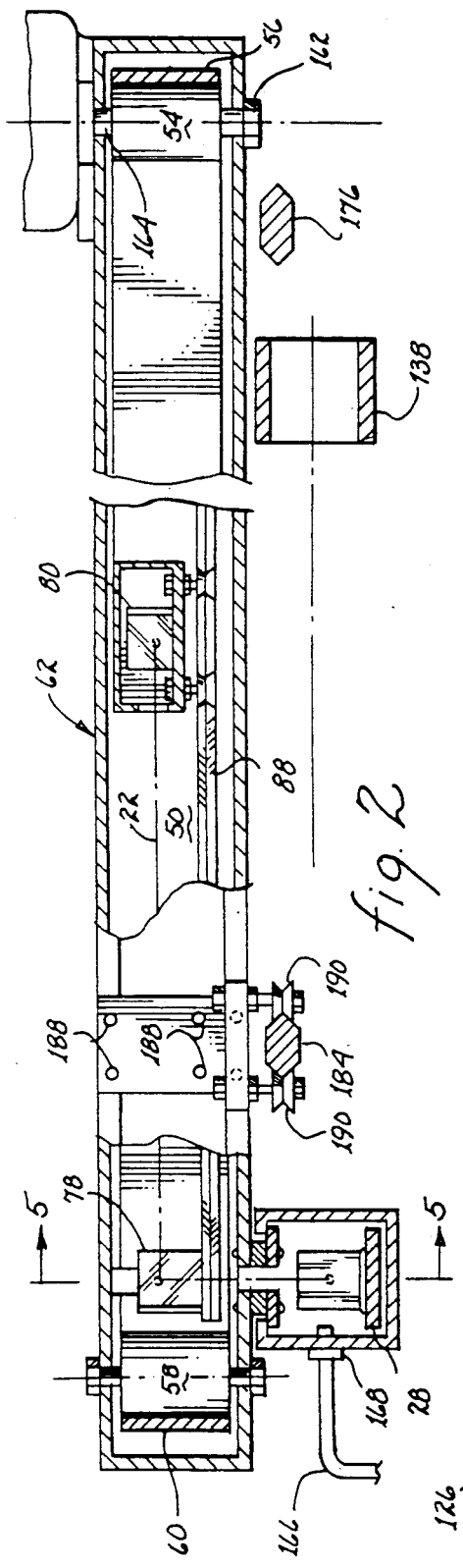
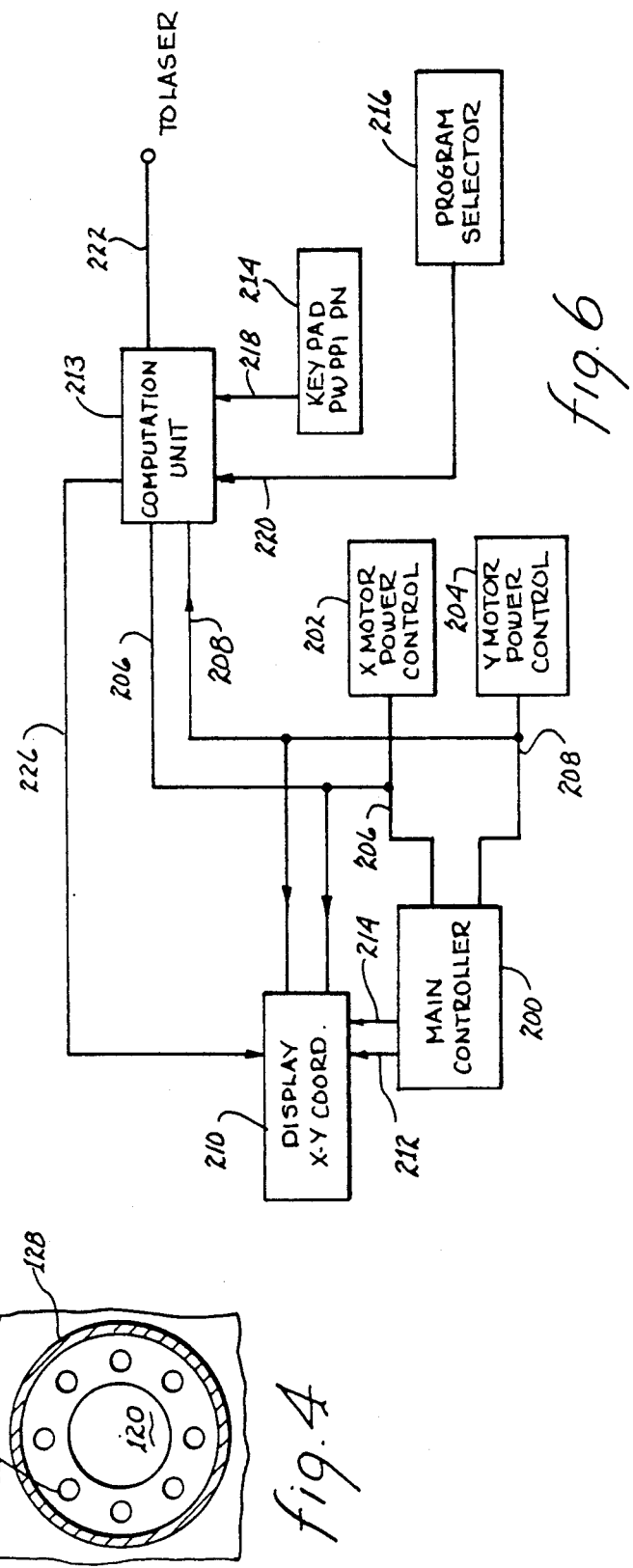
fig. 2
fig. 4
fig. 6

LASER MATERIAL PROCESSING APPARATUS AND METHOD THEREFORE

BACKGROUND OF THE INVENTION

1. Field of the Invention

This invention relates to laser material processing and methods therefore and, more particularly, to a laser material processor that may be constructed by modifying an X-Y plotter and method therefore.

2. Description of the Prior Art

In a typical computer controlled X-Y plotter, a pen is positioned on a plotting board by a pair of motors. More particularly, two orthogonal components of motion of the pen are controlled by an X motor and a Y motor, respectively.

Although each of the motors may be driven at a constant speed, it should be understood that the velocity of the pen is related to the square root of the sum of the squares of the speeds of the motors. Therefore, any change in the speed of a motor almost always changes the velocity of the pen. Additionally, the speed of a motor cannot be changed instantaneously; the change occurs during a time interval associated with a motor time constant.

A deviation in the velocity of the pen from a desired velocity may be of little importance when the plotter is used to plot a curve, for example. However, when a laser engraver, for example, is constructed by replacing the pen with an apparatus for focusing coherent light upon a workpiece, the deviation of the velocity results in a corresponding change in depth of engraving into the workpiece.

It should be appreciated that by-products of laser material processing are gaseous contaminants associated with the workpiece. The plotter has not heretofore been provided with a contaminent free optical path for the coherent light to prevent damage to optical elements included in the apparatus.

There is a need for a reliable and inexpensive laser material processor that can be made by modifying a computer controlled plotter.

SUMMARY OF THE INVENTION

An object of the present invention is to provide an improved laser material processor that may be constructed by modifying a computer controlled plotter and method therefore.

Another object of the present invention is to provide a laser material processor where coherent light is propagated inside a substantially enclosed optical path and method therefore.

Another present invention is to provide a laser material processor where a uniform energy density per unit length of processing is delivered to a workpiece.

According to a first aspect of the present invention, coherent light from a laser is propagates through a substantially enclosed optical path within a loop of a belt driven by an X motor and within a loop of a belt driven by a Y motor. The coherent light is diverted from the enclosed path to a lens that focuses it upon a workpiece.

According to a second aspect of the present invention, a laser provides a pulse of coherent light in response to a known value of the square root of the sum of the squares of two orthogonal components of a displacement of a lens that focuses a beam on a workpiece.

A laser material processor in accordance with the present invention may be constructed by modifying a computer controlled plotter. Optical elements of the processor are enclosed within passageways that are preferably kept free of contaminants by a compressed gas that passes therethrough. The processor may be used in processes such as engraving, soldering and etching.

These and other objects, features and advantages of the present invention, as well as details of the preferred embodiment thereof, will be more fully understood from the following description and drawing.

BRIEF DESCRIPTION OF THE DRAWING

FIG. 2 is a view of the processor of FIG. 1, with parts broken away, taken along the line 2—2;

FIG. 3 is a view of the processor of FIG. 1 taken along the line 3—3;

FIG. 4 is a view of a lens mounting fixture of FIG. 3 taken along the line 4—4;

FIG. 5b is a view of the processor of FIG. 2 taken along the line 5a-5a;

FIG. 6 is a block diagram of a control system of the processor of FIG. 1;

DESCRIPTION OF THE PREFERRED EMBODIMENT

Figure 1:
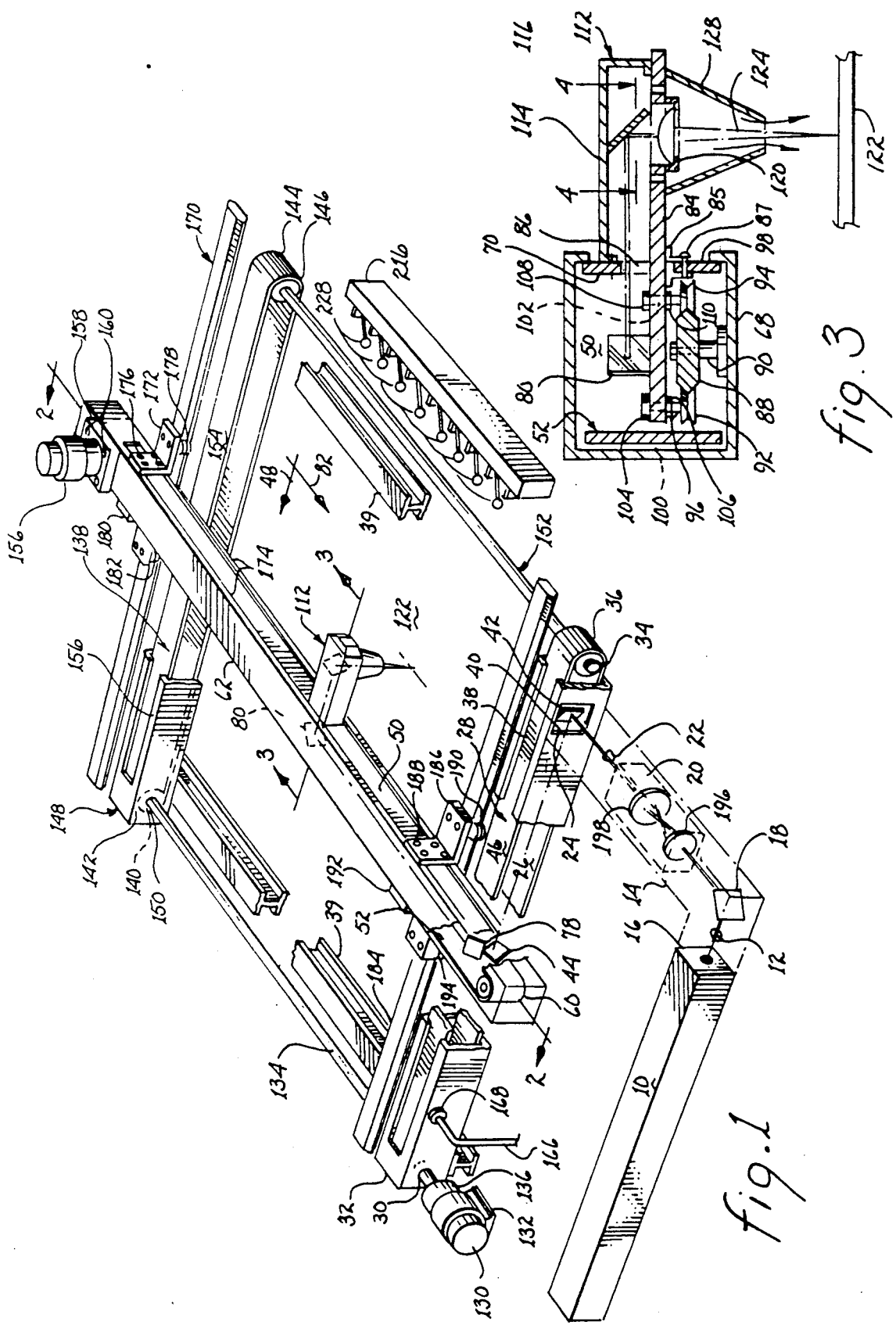
FIG. 1 is a partially schematic perspective view, with parts broken away, of belt drives and optics of an X-Y plotter that is modified for use as a laser material processor in the preferred embodiment of the present invention.

In a first aspect of the present invention, coherent light from a laser is propagated through an optical path substantially enclosed within loops of belts driven by an X motor and a Y motor. The coherent light is diverted from the optical path and focussed upon a workpiece.

In a second aspect of the present invention, the laser generates a known, constant number of pulses of coherent light per unit length of a displacement of a lens that focuses the coherent light on the workpiece.

Referring to FIGS. 1, 5b, 2 and 7, in the first aspect of the invention, optical elements of a laser material processor include a CO laser 10 that generates a beam 12 comprised of collimated, coherent light. In an alternative embodiment, either an ND-YAG laser or an eximer laser may be used.

Beam 12 propagates to a conduit 14 through an input end 16 thereof connected to the output of laser 10. More particularly, beam 12 propagates to a mirror 18 that is mounted within conduit 14 in any suitable manner.

In this embodiment, a beam shaper 20 (FIG. 7) is additionally mounted within conduit 14. Beam shaper 20 responds to a beam of light of a given diameter by providing a beam of light of an expanded diameter. In an alternative embodiment, another type of beam shaper may be used. Beam shapers are well known to those skilled in the art. The construction and purpose of beam shaper 20 is described hereinafter.

Beam 12 is reflected by mirror 18 to the input of beam shaper 20. In response to beam 12, beam shaper 20 provides a beam 22, comprised of collimated, coherent light. Beam 22 propagates through an output end 24 of conduit 14. It should be understood that the diameter of beam 22 is greater than the diameter of beam 12.

Output end 24 is connected to a passageway 26 within a loop of an X drive belt 28 (referred to as a proximal X loop hereinafter). Belt 28 has teeth that engage teeth of a drive gear 30 at an end 32 of the proximal X loop. Additionally, the teeth of belt 28 engage teeth of an idler gear 34 at an end 36 of the proximal X loop. The mounting of gears 30, 34 is described hereinafter.

Two sides and a bottom of passageway 26 are formed by a channel 38 that is closed at both ends. Channel 38 is fixedly connected to I bars 39 of the frame of the processor. The top of passageway 26 is forced by belt 28. Therefore, passageway 26 is substantially enclosed. The connection of output end 24 to passageway 26 is through a hole 40 in channel 38.

A mirror 42 is fixedly connected to channel 38 within passageway 26 near hole 40. Additionally, a mirror 44 is fixedly connected within passageway 26 to a top 46 of the proximal X loop (FIG. 5b). Therefore, mirror 44 is moveable in the direction of an arrow 48 and in a direction opposite therefrom, in accordance with movement of belt 28. Since passageway 26 is substantially enclosed, a flow of a compressed gas therethrough, provided in a manner explained hereinafter, maintains mirrors 42, 44 free of contaminants. The gas may alternatively be air, oxygen, an inert gas or any other suitable gas.

Beam 22 is propagated through hole 40 to mirror 42 and reflected therefrom to mirror 44. Since beam 22 is collimated, the movement of mirror 44 does not effect the reflection thereto of beam 22.

A passageway 50, similar to passageway 26, is within a loop of a Y drive belt 52, referred to as a Y loop hereinafter). Belt 52 has teeth that engage teeth of a drive gear 54 at a distal end 56 of the Y loop (F]g. 2). Additionally, the teeth of belt 52 engage teeth of an idler gear 58 at a proximal end 60 of the Y loop. Gears 54, 58 are similar to gears 30, 34 referred to hereinbefore. The mounting of gears 30, 34 is described hereinafter.

Figure 5A:
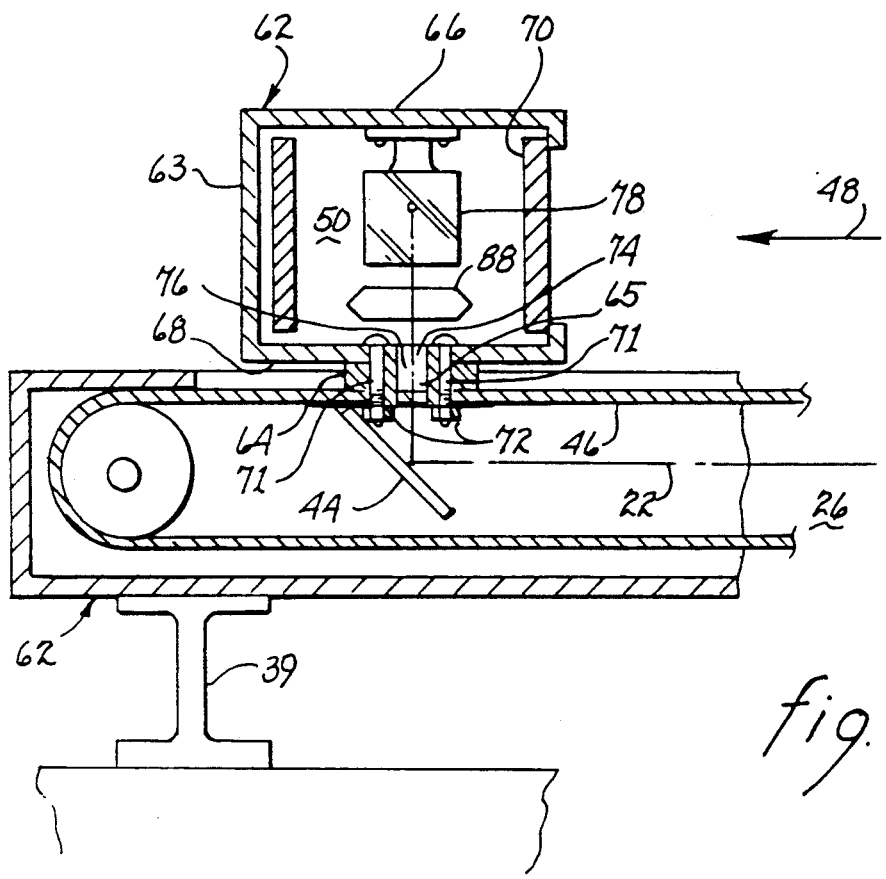
FIG. 5a is a view of a connection of an enclosure to the frame of the processor of FIG. 1.
Figure 5B:
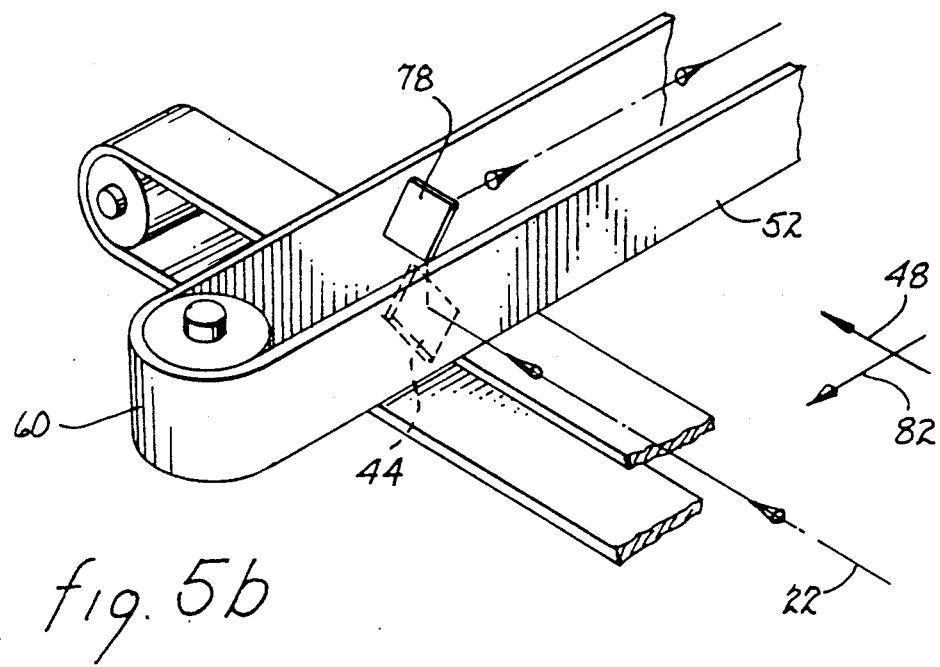

As shown in FIG. 5a, a side 63, a top 66 and a bottom 68 of passageway 50 are formed by a Y channel 62 that is closed at both ends. Additionally, a side 70 of the Y loop forms a side of passageway 50. Therefore, passageway 50 is substantially enclosed.

Near end 60 (FIGS. and 2), bottom 68 (FIG. 5a) is separated from top 46 by a spacer 64 that has a central hole 65 therethrough. Additionally, bottom 68, top 46 and spacer 64 have a pair of holes in alignment wherein bolts 71 are disposed. Nuts 72 engage threaded ends of bolts 71, whereby bottom 68, top 46 and spacer 64 are all connected together. Therefore, like mirror 44, passageway 50 is moveable in the direction of arrow 48 and the direction opposite therefrom in accordance with the movement of belt 28.

Bottom 68 has a hole 74 in alignment with hole 65. Similarly, top 46 has a hole 76 in alignment with hole 65. Accordingly, passageways 26, 50 are connected together through holes 65, 74, 76.

A mirror 78 is fixedly connected to channel 62 within passageway 50 near hole 74. Additionally, a mirror 80 is fixedly connected within passageway 50 to side 70 as explained hereinafter. Therefore, mirror 80 is moveable in the direction of an arrow 82 and in a direction opposite therefrom in accordance with movement of belt 52.

Since passageway 50 is substantially enclosed, a flow of compressed gas therethrough, provided in a manner explained hereinafter, maintains mirrors 78, 80 free of contaminants. It should be understood that the directions of arrows 48, 82 are orthogonal.

Beam 22 is reflected from mirror 44 through holes 65, 74 76 to mirror 78. Additionally, beam 22 is reflected from mirror 78 to mirror 80. Since beam 22 collimated, the movement of mirror 80 does not effect the reflection thereto of beam 22.

As shown in FIG. 3, mirror 80 is mounted upon a plate 84 that extends through a hole 86 in side 70. A stanchion 85 is integral with plate 84 and extends therefrom. A screw 87 connects stanchion 85 to side 70.

A V track 88 is fixedly connected to bottom 68 via a plurality of stanchions 90 (only one shown). V track 88 extends substantially from gear 54 to gear 58 (FIG. 2). V track 88 carries grooved wheels 92, 94.

Grooved wheels 92, 94 are rotatably mounted upon the proximal ends of extending shafts 96, 98, respectively. Shafts 96, 98 have threaded distal ends that extend through holes 100, 102, respectively, in plate 84. Nuts 104, 106 are on opposite sides of plate 84 where they engage threads of shaft 96. Correspondingly, nuts 108, 110 are on opposite sides of plate 84 where they engage threads of shaft 98. Therefore, shafts 96, 98 are fixedly connected to plate 84 whereby plate 84 is carried by wheels 92, 94 along V track 88 in accordance with movement of belt 52.

Outside of passageway 50, plate 84 forms the bottom of a lens enclosure 112 (FIG. 1). Like plate 84, a top 114 (FIG. 3) of enclosure 112 is connected to side 70. A mirror 116 is fixedly connected to top 114.

Within enclosure 112, plate 84 has connected thereto an annular bracket 118 that carries a lens 120. Lens 120 has a focal plane where a workpiece 122 is disposed.

Mirror 80 reflects beam 22 to lens 120 via mirror 116. In response to beam 22, lens 120 propagates a focussed beam 124 to workpiece 122.

As shown in FIG. 4, plate 84 has a plurality of holes 126 therethrough. Holes 126 are circularly disposed about the axis of lens 120. A nozzle 128 is connected to plate 84, outside of enclosure 112, coaxially with lens 120. As explained hereinafter, a compressed gas passes through enclosure 112 and through holes 126, thereby maintaining lens 120 free of contaminants. The gas is directed by nozzle 128 to workpiece 122.

Referring to FIG. 1, an X motor 130 is fixedly connected to the frame of the processor via a bracket 132. X motor 130 has a shaft 134 that passes through a hole 136 and a hole opposite therefrom (not shown) through channel 38. Gear 30 is fixedly mounted on shaft 134.

A belt 138 forms a loop (referred to as a distal X loop hereinafter) that has teeth that engage teeth of a drive gear 140 at an end 142 of the distal X loop. Additionally, at an end 144 of the distal X loop, teeth thereof engage teeth of an idler gear 146. The distal X loop is enclosed within a channel 148 that has a bottom (not shown) fixedly connected to I bars 39. It should be understood that the proximal and distal X loops are parallel.

Shaft 134 extends through a hole 150 in channel 148. Within channel 148, gear 140 is fixedly mounted on shaft 134.

In a similar manner gears 34, 146 are both fixedly mounted on an idler shaft 152 that extend through holes (not shown) in channels 38, 148. Since gears 30, 140 are fixedly mounted on shaft 134 and gears 34, 146 are fixedly mounted on shaft 152, the movement of the proximal X loop about gears 30, 34 replicates the movement of distal X loop 138 about gears 140, 146.

A top 154 of the distal X loop is adjacent to an open side 156 of channel 134. Bottom 68 is connected to top 154 near end 56 (FIG. 2) in any suitable manner. Therefore, channel 62 moves in the direction of arrow 48 and in the direction opposite therefrom in accordance with rotation of X drive 130. Moreover top 154 and top 46 are moveable supports for channel 62.

Additional support for channel 62 is provided by a V track 170, similar to V track 88. V track 170 is disposed adjacent to channel 148, parallel to belt 138. V track 170 is connected to I bar 39 in any suitable manner.

An angle bracket 172 is connected to lips 174 of channel 62 by screws 176. Additionally, grooved wheels 178 (one shown) are rotatably mounted on shafts that are fixedly connected to bracket 172. Wheels 178 are carried by V track 170. Wheels 178 are similar to wheels 92, 94 referred to hereinbefore.

An angle bracket 180, similar to bracket 172, is connected to side 63 in a manner similar to the connection of bracket 172. In a manner similar to grooved wheels 178, grooved wheels 182 (one shown) are connected to bracket 180. Wheels 182 are carried by V track 170. Therefore, V track 170 provides a moveable support for channel 62 as it moves in the direction of arrow 48 and in the direction opposite therefrom. Additional support for channel 62 is provided by a V track 184, similar to V track 88. V track 184 is disposed adjacent to channel 38, parallel to belt 28. V track 184 is connected to I bar 39 in any suitable manner.

An angle bracket 186, similar to bracket 172, is connected to lips 174 by screws 188. Additionally, grooved wheels 190 (one shown) are rotatably mounted on shafts that are fixedly connected to bracket 186. Wheels 190 are carried by V track 184. Wheels 190 are similar to wheels 92, 94 referred to hereinbefore.

An angle bracket 192, similar to bracket 172, is connected to side 63 in a manner similar to the connection of bracket 180. In a manner similar to grooved wheels 182, grooved wheels 194 (one shown) are connected to bracket 192. Wheels 194 are carried by V track 184. Therefore, V track 184 provides a moveable support for channel 62 as it moves in the direction of arrow 48 and in the direction opposite therefrom.

A Y motor 156 is fixedly connected to a mounting bracket 158 is fastened to top 66 via four screws 160 (three shown). Y motor 156 has a shaft 162 that extends through a hole 164 in channel 62 (FIG. 2). Gear 54 is fixedly mounted on shaft 162. Therefore, the movement of lens 120 (FIGS. 3 and 4) in the direction of arrow, 82. and in the direction opposite therefrom is in accordance with rotation of Y motor 156.

Preferably, a tube 166 is connected to passageway 26 through a hole in channel 38 wherein a sleeve 168 is carried. When the compressed gas is provided through tube 166, it passes through passageways 26, 50, the interior of enclosure 112 and to workpiece 122 through holes 126 and nozzle 128. The gas maintains mirrors 42, 44, 78, 80 and lens 120 free of contaminants.

It should be understood that the diameter of beam 124 on workpiece 122 is inversely related to the diameter of beam 22. Accordingly, beam shaper 20 is utilized to reduce the diameter of beam 124 on Workpiece 122. In an alternative embodiment, a beam shaper is not used.

Figure 7:
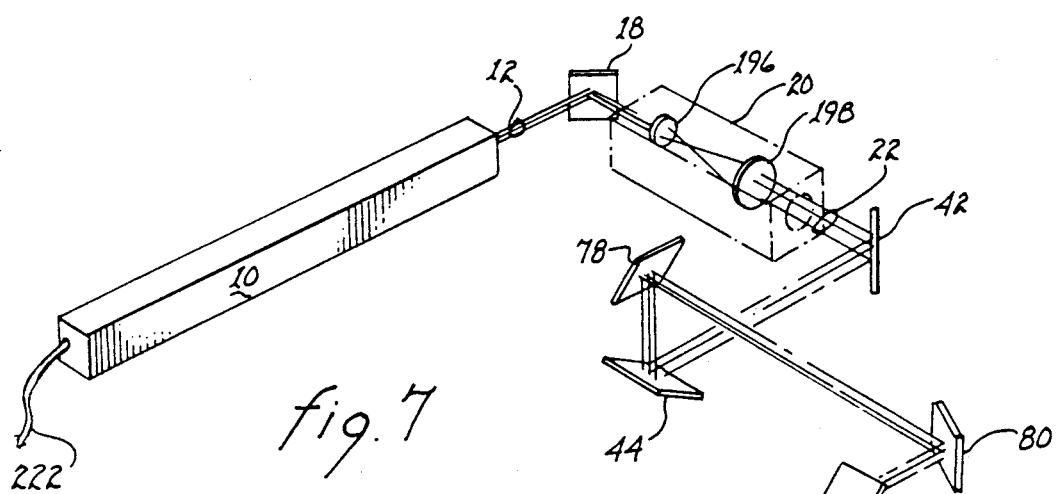
FIG. 7 is a schematic diagram of propagation of coherent light to a workpiece in the processor of FIG. 1.

Referring to FIG. 7, beam shaper 20 is comprised of lenses 196, 198 that are in axial alignment with beams 12, 22. Lens 196 has a shorter focal length than lens 198. Moreover, lenses 196, 198 are disposed with a displacement therebetween substantially equal to the sum of their focal lengths.

Figure 8:
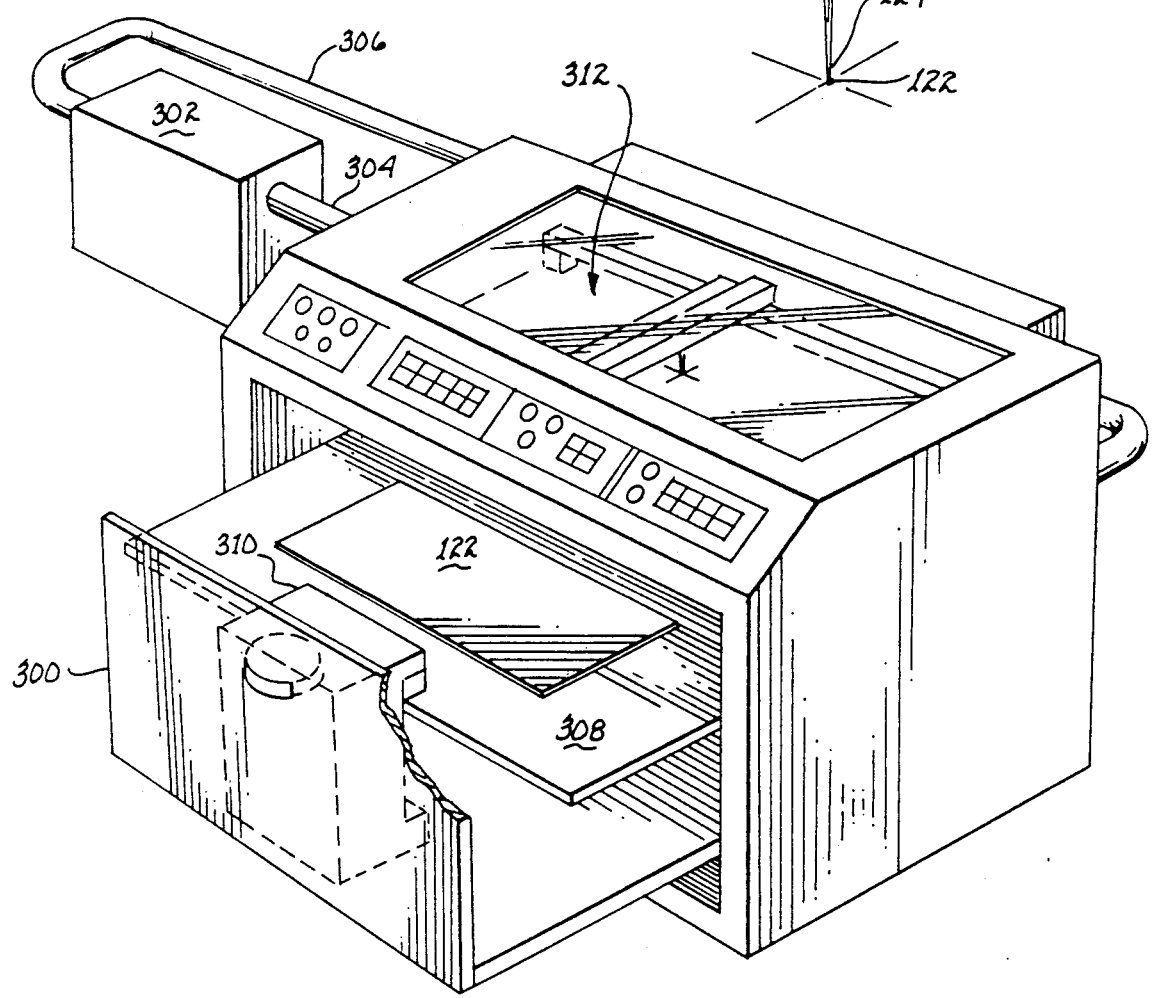
FIG. 8 is a perspective view of the processor of FIG. 1.

As shown in FIG. 8, the processor may be included in a console wherein workpiece 122 is insertable and removable via a drawer 300. A blower (not shown) is operable to circulate air within the console through a top portion thereof above workpiece 122 when drawer 300 is closed. The air is circulated through a filter 302 and over workpiece 122 via an inlet pipe 304 and an outlet pipe 306.

Workpiece 122 is installed on a support plate 308 that is carried by within a device 310 that is operable to move support 308 vertically to bring workpiece 122 into the focal plane of lens 120.

The console has a top comprised of a window 312 made from a plastic that is opaque at the wavelength of the coherent light but otherwise transparent. Accordingly, workpiece 122 may be viewed by an observer while it is being engraved. The observer may, for example, utilize device 310 to adjust the distance between workpiece 122 and lens 120 While observing a test processing of workpiece 122.

Thus there has been described a laser material processor where coherent light from a laser is transmitted through an enclosed optical path, reflected therefrom, and focussed upon a workpiece.

Referring to FIG. 6, in the second aspect of the present invention, a main controller 200 is connected to an X motor power control 202 and a Y motor power control 204 through signal lines 206, 208, respectively. X control 202 and Y control 204 respectively control rotation of x motor 130 and Y motor 156.

X motor 130 causes a known incremental movement of belt 28 in response to a pulse provided on line 206. Similarly, Y motor 156 causes the known incremental movement of belt 154 in response to a pulse provided on line 208.

Controller 200 is of a type that is used in an X-Y plotter to cause an X motor and a Y motor to move a pen in accordance with a plotting program. In this embodiment controller 200 causes movement of lens 120 in accordance with a processing program.

Controller 200 is additionally connected to a display 210 through signal lines 212, 214. Controller 200 provides on line 212 a digital signal representation of movement of belt 28 (or X belt 138). Correspondingly, controller 200 provides on line 214 a digital signal representation of movement of belt 52. Lines 206, 208 are additionally connected to display 210. In response to signals provided by controller 200, display 210 provides a visual indication of where lens 120 focuses beam 124 on workpiece 122.

Controller 200 is connected through lines 206, 208 to a computation unit 213 Additionally, a key pad 214 and a program selector 216 are connected to unit 213 through a plurality of signal lines 218 and a plurality of signal lines 220, respectively. In this embodiment, the number of pulses of coherent light per inch of displacement of beam 124 on workpiece 122 and the duration of each pulse in accordance with one of eight laser pulsing programs that is selected via selector 216. Digital signal representations of parameters associated with the pulsing programs are generated via key pad 214 and stored in unit 213. Key pad 214 is of a type well known in the art. Therefore, key pad 214 is utilized to establish pulsing programs.

Key pad 214 may, for example, be used to establish the following pulsing programs.

| LASER PULSING PROGRAM NUMBER | PULSES PER INCH | PULSE DURATION (microseconds) |
|---|---|---|
| 1 | 1000 | 50 |
| 2 | 500 | 100 |
| 3 | 200 | 150 |
| 4 | 150 | 250 |
| \| | \| | \| |
| \| | \| | \| |
| 7 | 100 | 300 |
| 8 | 50 | 1000 |

When pulsing program number 1 is selected, unit 213 internally generates an incremental position voltage proportional to the square root of the sum of the squares of a component of displacement of lens 120 in the direction of arrow 48 and a component of displacement of lens 120 in the direction of arrow 82 (FIG. 1). When the incremental position voltage is proportional to 0.001 inches, unit 213 provides a pulse of 50 microsecond duration on an output signal line 222. Thereafter, the incremental position voltage is rapidly set to zero volts and another 50 microsecond pulse is generated as described hereinbefore.

Line 222 is connected to laser 10. In response to the 50 microsecond pulse, laser 10 causes be beam 12 to consist of a pulse of 50 microsecond duration of collimated coherent light Unit 213 may alternatively be adjusted to provide pulses of a constant rate and duration to laser 10.

Unit 213 is connected through a plurality of signal lines 226 to display 210. In response to signals provided on lines 226, display 210 provides a display of a selected pulsing program number and pulses per inch and pulse duration associated therewith.

Referring to FIG. 1, program selector 216 is comprised of a bank of eight switches 228 that are connected to the frame. The switches 228 are respectively associated with the eight pulsing programs. At the start of an execution of a material processing program, controller 220 causes belts 24,158 to move housing 112 to momentarily close the one of switches 228 associated with a desired pulsing program. The momentary closing of one of switches 228 is analagous to an automatic selection of a pen prior to a computer of the X - Y plotted executing the plotting program. The automatic selection of the pen is well known to those skilled in the art.

While the invention has been particularly shown and described with reference to a preferred embodiment thereof, it will be understood by those skilled in the art that changes in form and detail may be made therein without departing from the spirit and the scope of the invention.

I claim:

1. A laser material processor for processing a workpiece, comprising:

a lens that has a focal plane where said workpiece is disposed;

means for moving said lens in accordance with a material processing program;

means for propagating a collimated coherent light beam of a know duration within an enclosed passageway to said lens in response to a known displacement; and beam shaper means coupled too said light beam for receiving said light beam and for altering the diameter of said light beam.

2. The processor of claim 1 wherein said means for propagating comprises:

means for generating an incremental position signal proportional to a displacement of said lens;

a laser, connected to said generating means, that generates a pulse of said light beam in response to said position signal being proportional to said known displacement.

3. The processor of claim 2 wherein said laser is selected from the group consisting of a $CO_2$ laser, an ND-YAG laser and an eximer laser.

4. A laser material processor for processing a workpiece, comprising:

a lens that has a focal plane where said workpiece is disposed;

means for moving said lens in accordance with a material processing program;

means for propagating collimated coherent light to said lens in response to a known displacement thereof;

said means for propagating comprises:

means for generating an incremental positional signal proportional to a displacement of said lens;

a laser, connected to said generating means, that generates a pulse of said light beam in response to said position signal being proportional to said known displacement;

said means for propagating further comprises:

an X belt that is operable to move in an X direction and in a direction opposite therefrom;

an X channel wherein said belt is disposed, said X channel and said X belt forming an X passageway having a hole therethrough where said pulse of light is received, said X channel being connected to the frame of said processor;

a first X mirror fixedly connected to said X channel within said X passageway to reflect said received light;

a second X mirror connected to said X belt, light from said first X mirror being reflected to said second X mirror;

a Y belt that is operable to move in a Y direction and in a direction opposite therefrom, said X and Y directions being orthogonal;

a Y channel wherein said Y belt is disposed, said Y channel and said Y belt forming a Y passageway, said Y channel having a proximal end connected to said X belt, said X belt and said proximal end of said Y channel having substantially aligned holes through which said X and Y passageways are connected;

a first Y mirror fixedly connected to said Y channel within said Y passageway, light from said second X mirror being reflected through said aligned holes to said first Y mirror:

a second Y mirror connected to said Y belt, light from said first Y mirror being reflected to said second Y mirror, said Y belt having a hole therethrough where light reflected from said second Y mirror passes from said Y passageway to said lens.

5. The processor of claim 4 wherein said means for moving comprises:

an X drive gear fixedly mounted on an X drive shaft at one end of said X passageway;

an X idler gear fixedly mounted on a rotatable X idler shaft at the other end of said X passageway, said X belt being connected in an X loop with teeth of said X belt engaging teeth of said X gears; and X drive means for rotating said X drive shaft in accordance with said processing program.

6. The processor of claim 4 wherein said means for moving comprises;
 a Y drive gear fixedly mounted on a Y drive shaft at one end of said Y passageway;
 a Y idler gear fixedly mounted on a rotatable shaft at the other end of said Y passageway, said Y belt being connected in a Y loop with teeth of said Y belt engaging teeth of said Y gears; and
 Y drive means for rotating said Y drive shaft in accordance with said processing program.

7. The processor of claim 4 additionally comprising means for providing a flow of a compressed gas through said passageways to said workpiece.

8. The processor of claim 7 additionally comprising a nozzle connected coaxially with said lens, said gas flowing through said nozzle to said workpiece.

9. The processor of claim 7 wherein said gas is selected from the group consisting of air, oxygen and an inert gas.

10. a laser material processor for processing a workpiece, comprising:
 a lens that has a focal plane where said workpiece is disposed;
 means for moving said lens in accordance with a material processing program;
 means for propagating collimated coherent light to said lens in response to a known displacement thereof;
 additionally including a beam shaper that receives said light and provides to a first mirror substantially collimated light.

11. The processor of claim 2 additionally comprising means for selecting said known duration and a certain displacement.

12. The processor of claim 2 additionally comprising means for providing a display of where said light is focussed upon said workpiece, a certain duration of said light beam and said known displacement.

13. The processor of claim 1 including means for circulating filtered air above said workpiece.

14. In the method of laser processing a workpiece, the steps of:
 providing a lens that has a focal plane where a workpiece is disposed;
 moving said lens in accordance with a laser processing program;
 propagating a pulse of a collimated coherent light beam in response to a known displacement of said lens; and
 shaping said light beam to change the diameter of said light beam.

15. In the method of claim 14, the additional steps of:
 generating an incremental position signal of a known value in response to a preselected displacement of said lens; and
 generating said pulse of light in response to said incremental positional signal.

16. In the method of claim 14, the additional step of directing a compressed gas through said passageway to said workpiece.

17. In the method of claim 14, the additional step of circulating a flow of filtered air above said workpiece.

18. A laser material processor, comprising:
 a lens;
 means for adjusting the distance of said lens from a workpiece;
 means for moving said lens in accordance with a processing program;
 means for propagating within an enclosed passageway a pulse of a collimated coherent light beam of known duration to said lens in response to a known displacement of said lens; and
 beam shaper means coupled to said light beam for receiving said light beam and for altering the diameter of said light beam.

19. A laser material processor, comprising: a lens;
 means for adjusting the distance of said lens from a workpiece;
 means for moving said lens inn accordance with a processing program; and
 means for propagating a pulse of collimated coherent light of known duration to said lens in response to a known displacement of said lens; additionally comprising a console wherein said lens is disposed, said console having a drawer wherein said workpiece is placed, said workpiece being within said console and said means for adjusting being operable when said drawer is closed.

20. The processor of claim 19 wherein said console has a top comprised of a material that is opaque at the wavelength of said coherent light, said top providing a view of said workpiece.

21. The process of claim 19 additionally comprising means for circulating filtered air within said console above said workpiece.

* * * * *

UNITED STATES PATENT AND TRADEMARK OFFICE
CERTIFICATE OF CORRECTION

PATENT NO. : 5,051,558
DATED : Sep. 24, 1991
INVENTOR(S) : Yefim P. Sukhman

It is certified that error appears in the above-identified patent and that said Letters Patent is hereby corrected as shown below:

IN THE CLAIMS:

Claim 1, line 8, change "know" to -- known --.

Claim 1, line 11, change "too" to -- to --.

Claim 4, line 11, change "positional" to -- position --.

Claim 4, line 20, before "belt" insert -- X --.

Claim 10, line 1, change "a" to -- A --.

Claim 11, line 2, delete "said known" and substitute therefore -- a certain --.

Claim 11, line 2, after "duration" insert -- of said light beam --.

Claim 11, line 2, delete "a certain" and substitute therefore -- said known --.

Claim 15, line 6, change "positional" to -- position --.

Claim 19, line 4, change "inn" to -- in --.

UNITED STATES PATENT AND TRADEMARK OFFICE
CERTIFICATE OF CORRECTION

PATENT NO. : 5,051,558

DATED : September 24, 1991

INVENTOR(S) : Yefim P. Sukhman

It is certified that error appears in the above-identified patent and that said Letters Patent is hereby corrected as shown below:

Claim 21, line 1, change "process" to -- processor --.

Signed and Sealed this

Twenty-seventh Day of April, 1993

Attest:

MICHAEL K. KIRK

*Attesting Officer*   Acting Commissioner of Patents and Trademarks